United States Patent
Yoviene

[15] 3,706,468
[45] Dec. 19, 1972

[54] VEHICLE BUMPER

[72] Inventor: Salvatore J. Yoviene, 79 McClellan Circle, Buffalo, N.Y.

[22] Filed: Nov. 27, 1970

[21] Appl. No.: 93,004

[52] U.S. Cl. .................... 293/88, 293/71 R, 267/140
[51] Int. Cl. ............................................. B60r 19/08
[58] Field of Search ............ 293/66, 69 R, 71, 87, 88; 267/139, 140

[56] References Cited

UNITED STATES PATENTS

| | | | |
|---|---|---|---|
| 1,348,030 | 7/1920 | Millard | 293/71 R |
| 2,230,333 | 2/1941 | Painter | 293/71 R |
| 2,128,656 | 8/1938 | Long | 293/66 |
| 2,953,409 | 9/1960 | Barenyi | 293/88 X |
| 2,260,578 | 10/1941 | Murray | 293/69 R |
| 2,145,952 | 2/1939 | Ryan | 293/71 R |
| 2,650,126 | 8/1953 | Barnas | 293/64 |
| 1,771,319 | 7/1930 | Schmidt | 293/69 R |

Primary Examiner—James B. Marbert
Assistant Examiner—Robert Saifer
Attorney—Bean & Bean

[57] ABSTRACT

A vehicle bumper including a relatively rigid plate member, an impact energy absorbing body portion adhesively fixed to and sized to extend substantially coextensive with the plate member, and a plurality of impact energy absorbing-mounting devices for fixing the plate member to the vehicle.

1 Claim, 4 Drawing Figures

PATENTED DEC 19 1972  3,706,468
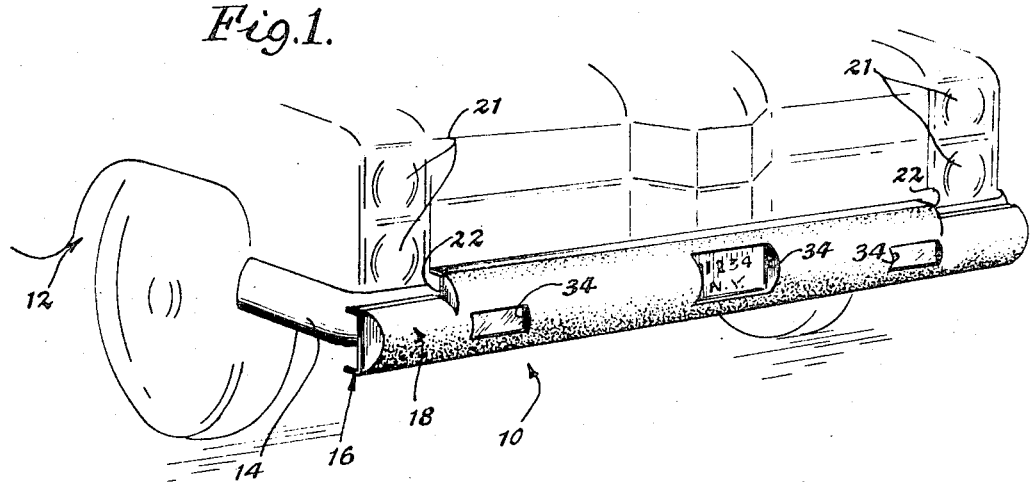
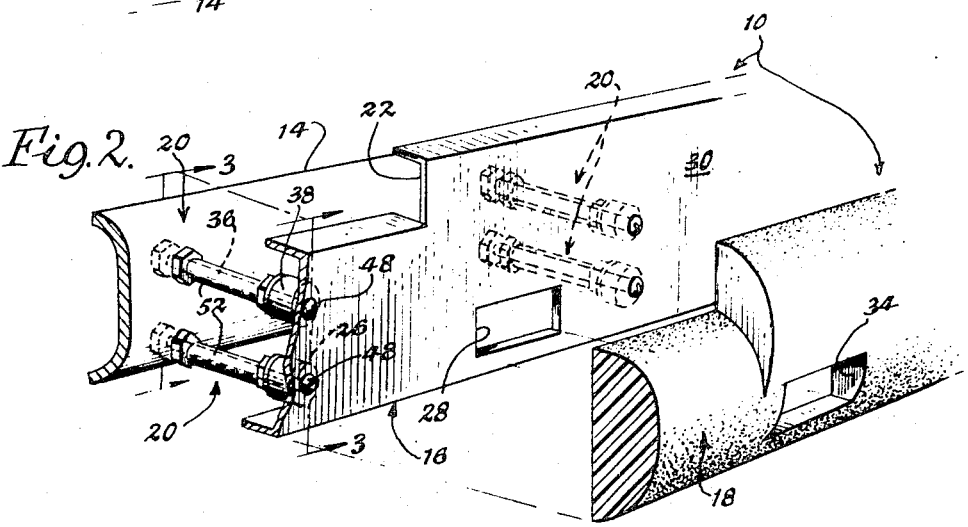
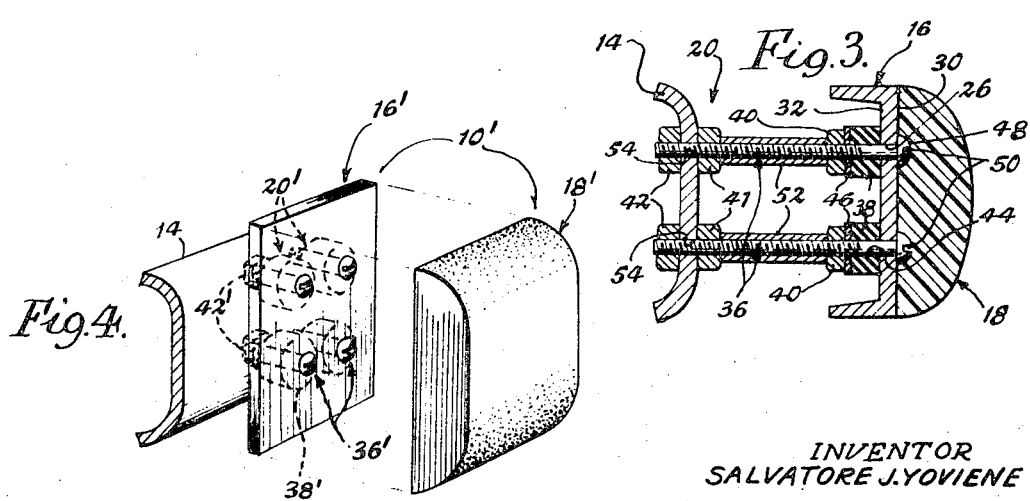
INVENTOR
SALVATORE J. YOVIENE
BY
Bean & Bean
ATTORNEYS

VEHICLE BUMPER

SUMMARY OF THE INVENTION

The present invention relates to vehicle bumpers and more particularly to bumpers of the type including resiliently deformable materials adapted to absorb the energy of impact.

More specifically, the present bumper includes a rigid plate member having a plurality of openings extending therethrough; a resiliently deformable impact energy absorbing body portion adhesively secured to the plate member and sized to extend substantially co-extensively therewith; and a plurality of devices for securing the plate member to the vehicle, wherein each of such devices includes a resiliently deformable impact energy absorbing block, a mounting rod freely received within one of the plate member openings, and means for fixing the mounting rod to the vehicle and to clampingly maintain the block in engagement with the plate member, whereby the block is resiliently deformed upon movement of the plate member towards the vehicle.

When the bumper is subjected to an impact, the energy of impact is first absorbed by resilient deformation of the body portion in the area of impact and thereafter absorbed by resilient deformation of the blocks as the plate member is forced to move relative to the mounting rods towards the vehicle. This construction serves to effectively distribute and dissipate an impact load over a relatively large area of the front end of the vehicle.

DRAWINGS

The nature and mode of the present invention will now be more fully described in the following detailed description taken with the accompanying drawings wherein:

FIG. 1 is a perspective view of the bumper of the present invention showing it mounted upon a vehicle, such as an automobile;

FIG. 2 is a fragmentary exploded perspective view of the bumper shown in FIG. 1;

FIG. 3 is a sectional view taken generally along line 3—3 in FIG. 2; and

FIG. 4 is a fragmentary perspective view of a modified form of the bumper of the present invention.

DETAILED DESCRIPTION

The vehicle bumper of the preferred embodiment of the present invention is generally designated as 10 in FIG. 1 and shown as being mounted on the front end of a vehicle 12, such as a passenger automobile. It will be understood that, while vehicle 12 may be provided with any suitable fitting or fittings for the purpose of mounting bumper 10, it is preferable to mount bumper 10 directly on the solid metal bumper 14 conventionally provided on vehicle 12.

Bumper 10 is shown in FIG. 2 as generally including a relatively rigid steel plate member 16; an impact energy absorbing body portion 18, which is formed of a resiliently compressible rubber or plastic foam material; and a plurality of impact energy absorbing-bumper mounting devices 20. Plate member 16 may be formed from sheet stock of upwards of about one-fourth inch thick and body portion 18 may be upwards of about 8 inches thick depending on the impact loads for which the bumper is designed to accommodate.

As will be apparent from viewing FIGS. 1 and 2, plate member 16, which is dimensioned to span substantially across the front of vehicle 12, is cut away adjacent opposite ends thereof, as at 22, so as to provide a bumper of inverted T-shaped design. This construction prevents blockage of head light 21, while providing for protection of the radiator and/or engine of a conventional front end drive vehicle. As will be apparent, a bumper formed in accordance with the present invention may also be mounted at the rear of vehicle 12 to accommodate for rear end collisions.

Plate member 16 may also be provided with an appropriate number of relatively small through openings 26 for receipt of mounting devices 20 and relatively large through openings 28, which are sized and arranged to provide unobstructed view of the vehicle parking lights and/or license plate. For purposes of reference, plate member 16 will be considered as having first and second surfaces 30 and 32, indicated in FIG. 3, which face relatively away from and towards vehicle 12, respectively.

Body portion 18 is sized to extend substantially co-extensive with plate member 16 and formed with through openings 34 alignable with plate member openings 28, when the body portion is secured to plate member surface 30, as by a suitable adhesive. The exposed surface of body portion 18 may be contoured and finished, as desired to provide an aesthetically pleasing appearance.

Devices 20 are best shown in FIGS. 2 and 3 as each including a screw threaded steel mounting rod 36; an impact energy absorbing block 38 formed of a resilient rubber or plastic material; and means in the form of first, second and third lock nuts 40–42 for fixing rod 36 to solid metal bumper 14 and for clamping block 38 in engagement with plate member surface 32. Preferably, block 38 is formed with a through opening 44 for freely receiving rod 36 and includes a rigid metal washer 46 in order to provide a bearing surface for lock nut 40. Also, rod 36 is preferably formed of about ½ inch diameter stock, which is threaded substantially throughout the length thereof and provided with an integrally formed enlarged head portion 48 having a screw driver receiving slot 50.

Sleeves or tubes 52 of appropriate lengths may be fitted over rod 36 for decorative purposes. Sleeves may be formed of metal or plastic, as desired.

Bumper 10 may be assembled on bumper 14 by first drilling openings 54 through the latter, shown only in FIG. 3, as necessary to accommodate the mounting devices 20 required by a particular bumper installation. While the number of devices 20 will vary, depending upon the size of bumper 10 and the loads it is designed to accommodate, it has been found that a bumper for a full size passenger automobile may require on the order of about 12 of such devices. Regardless of the number of mounting devices employed, such devices should be vertically, as well as transversely spaced throughout the extent of the bumper to permit loads to be uniformly distributed to bumper 14.

After an appropriate number of holes 54 have been drilled in bumper 14, bolts 36 are slid rearwardly through plate member openings 26; whereafter blocks 38 and sleeves 52 are slid onto and lock nuts 40 and 41 threaded onto the rods. Preferably sleeves 52, and if required, bolts 36 would be precut to lengths accommodating for differences in spacing between surface 32 and the surface of bumper 14, as required by the contour of the latter. The attaching end of rods 36 are then inserted through holes 54 and lock nut 42 applied to retain the rod and solid bumper in assembled condition.

When the desired orientation of bumper 10 is completed, lock nuts 41 and 42 would be tightened against the opposing surfaces of the solid bumper. Normally, lock nut 40 would have been previously tightened against washer 46, such as to partially precompress body 38 against plate member surface 32, as required to resiliently constrain the plate member and rod 36 from rattling. The proper tightening of the lock nuts is greatly facilitated by the provision of slot 50.

As will be apparent, when bumper 10 is subjected to an impact, energy of the impact is first absorbed by resilient deformation of body portion 18 in the area of impact and thereafter absorbed by resilient deformation of blocks 38, as plate member 16 is forced to move relative to rods 36 towards solid bumper 14. This construction serves to effectively distribute and dissipate an impact load over a relatively large area of the front end of the automobile.

FIG. 4 illustrates a modified form of the present invention wherein similar components are designated by "primed" numerals. In this construction, bumper 10' is in the form of a small sized "bumperette", which is adapted to be mounted in pairs on solid bumper 14. The mounting for bumper 10' differs from that previously described above, in that the first and second lock nuts and the rod enclosing sleeve are omitted, such that upon tightening of third lock nut 42' on the mounting end of rod 36', plate member 16' is drawn towards solid bumper 14 so as to clampingly secure block 38 therebetween.

I claim:

1. A bumper construction for a vehicle having a fitting extending horizontally transversely of an end of said vehicle to which said bumper construction may be attached, said fitting having a plurality of apertures extending therethrough, said bumper construction comprising in combination:

a rigid plate member, said plate member being dimensioned to extend substantially co-extensively with said fitting completely across said end of said vehicle and having a first surface adapted to face outwardly from said vehicle and a second surface adapted to face towards said vehicle, said plate member having a plurality of through openings extending between said surfaces thereof, at least certain of said openings being in registry with said fitting apertures;

a plurality of securing devices corresponding in number to said certain openings for securing said plate member to said fitting, each of said devices including a resiliently deformable impact energy absorbing block having an opening therethrough, an apertured rigid metal washer, a mounting rod having an enlarged end portion engaged with said first surface and a mounting end portion, and means to fix said mounting end portion to said vehicle fitting and to clampingly maintain said block in engagement with said second surface of said plate member whereby said block is resiliently deformable upon movement of said plate member towards said vehicle fitting, said mounting end portion being threaded substantially throughout its length and extending from said enlarged end portion freely and successively through one of said plate member openings, said block opening, said metal washer, and an aperture with which said one plate member opening is in registry, said means including first, second and third nuts, said first lock nut being adjustably threaded on said mounting end portion to bear on said metal washer and cooperating with said enlarged end portion to clampingly maintain said block in engagement with said second surface, said second and said third lock nuts being adjustably threaded on said mounting end portion to clamp said vehicle fitting therebetween and to vary the distance between said second and first lock nuts as required to compensate for variations in the distances between said fitting and said second surface adjacent said certain openings and apertures, and said certain openings being arranged in a vertical and horizontal spaced relationship relative to one another throughout the extent of said plate member whereby to permit loads imposed on said plate member to be uniformly distributed to said fitting by said devices; and a resiliently deformable impact energy absorbing body portion secured to said first surface of said plate member and sized to extend substantially coextensively therewith and covering said enlarged end portions of each said mounting rod.

* * * * *